US012792096B2

(12) United States Patent
Feng et al.

(10) Patent No.: US 12,792,096 B2
(45) Date of Patent: Nov. 10, 2026

(54) DISPLAY PANEL INCLUDING SUPPORT STRUCTURE AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Binfeng Feng, Beijing (CN); Xuan Tao, Beijing (CN); Fei Li, Beijing (CN); Shangnan Jin, Beijing (CN); Bowen Xiao, Beijing (CN)

(73) Assignees: Chengdu BOE Optoelectronics Technology Co., Ltd., Chengdu (CN); Beijing BOE Technology Development Co., Ltd., Beijing (CN)

( * ) Notice: Subject to any disclaimer, the term of this patent is extended or adjusted under 35 U.S.C. 154(b) by 406 days.

(21) Appl. No.: 18/564,048

(22) PCT Filed: Mar. 31, 2023

(86) PCT No.: PCT/CN2023/085587

§ 371 (c)(1),
(2) Date: Nov. 24, 2023

(87) PCT Pub. No.: WO2024/197851

PCT Pub. Date: Oct. 3, 2024

(65) Prior Publication Data

US 2025/0081363 A1 Mar. 6, 2025

(51) Int. Cl.
*G06F 1/16* (2006.01)

(52) U.S. Cl.
CPC .................................. *G06F 1/1652* (2013.01)

(58) Field of Classification Search
CPC ............... G06F 1/1652; H04M 1/0268; H05K 2201/056; G02F 1/133305
See application file for complete search history.

(56) References Cited

U.S. PATENT DOCUMENTS 9,379,355 B1 * 6/2016 Lee ...................... H10K 59/131
10,698,449 B2 * 6/2020 Raff ...................... G06F 1/1652
2022/0137463 A1 5/2022 Qin et al.
(Continued)

FOREIGN PATENT DOCUMENTS

CN 210955911 U 7/2020
CN 112086495 A 12/2020
(Continued)

OTHER PUBLICATIONS

PCT/CN2023/085587 international search report.
PCT/CN2023/085587 Written Opinion.

*Primary Examiner* — James Wu
(74) *Attorney, Agent, or Firm* — IPro, PLLC

(57) ABSTRACT

The display panel includes a panel layer and a support layer. The panel layer includes a panel area and a bending area disposed on a side of the panel area in a first direction. The support layer is disposed on a back side of the panel area, and the support layer includes a support body and a support structure disposed on a side of the support body away from the panel layer. The support structure is disposed on the inner side of an edge of the support layer corresponding to the bending area, so that the bending area, when being bent, is fixed to the support layer through the support structure.

16 Claims, 8 Drawing Sheets

(56) References Cited

U.S. PATENT DOCUMENTS

| | | | | |
|---|---|---|---|---|
| 2022/0158124 | A1 | 5/2022 | Koo et al. | |
| 2023/0189441 | A1* | 6/2023 | Park | H05K 1/147<br>361/807 |
| 2024/0028078 | A1 | 1/2024 | Zhao | |

FOREIGN PATENT DOCUMENTS

| | | | |
|---|---|---|---|
| CN | 112201739 | A | 1/2021 |
| CN | 113470521 | A | 10/2021 |
| CN | 113506513 | A | 10/2021 |
| CN | 114038338 | A | 2/2022 |
| CN | 115188908 | A | 10/2022 |

* cited by examiner

DISPLAY PANEL INCLUDING SUPPORT STRUCTURE AND DISPLAY DEVICE

CROSS-REFERENCE TO RELATED APPLICATIONS

This application is a national stage of international PCT Application No. PCT/CN2023/085587, filed on Mar. 31, 2023, the entire contents of which are incorporated herein by reference for all purposes.

TECHNICAL FIELD

The present disclosure relates to the field of display technology, and more particularly, to a display panel and a display device.

BACKGROUND

Flexible display panels (such as flexible OLED panels) have attracted increasing attention and application due to their advantages of being bendable, convenient to carry, and wide application range. For example, compared to LCD panels and rigid OLED panels, the application proportion of flexible OLED panels in the commonly used car mounted display devices is increasing. Some car mounted display devices can be used in both horizontal and vertical display modes by users. In a flexible OLED panel, due to the need to bind an IC chip and other components to the back side of the display panel in a bending area, the provision of the bending area makes the corresponding border on the side of the flexible OLED panel relatively wider, rendering undesirable user experience in the two viewing modes in use.

SUMMARY

According to a first aspect of the embodiments of the present disclosure, there is provided a display panel, including:

- a panel layer including a panel area and a bending area disposed on a side of the panel area in a first direction;
- a support layer disposed on a back side of the panel area, the support layer including a support body and a support structure disposed on a side of the support body away from the panel layer, the support structure being disposed on an inner side of an edge of the support layer corresponding to the bending area, so that the bending area, when being bent, is fixed to the support layer through the support structure.

In some embodiments, the support structure includes a transition support surface disposed at an edge of the display panel, and in the first direction, at least a portion of the transition support surface is a convex smooth curved surface.

In some embodiments, in the first direction, at least a portion of the transition support surface is a segment of cambered surface, or at least a portion of the transition support surface is connected in sequence by multiple segments of cambered surfaces that are smoothly transitioned.

In some embodiments, the support structure includes a fixed bonding surface in the transition support surface disposed closer to a middle of the support layer, the fixed bonding surface facing away from the panel layer and in a straight shape, and connection between the fixed bonding surface and the transition support surface transitions smoothly.

In some embodiments, the support structure is integrally formed with the support body.

In some embodiments, the support structure is a solid structure formed by a die casting process: or,

- the support body is a plate-shaped structure, and the support structure is formed by bending a plate-shaped structure connected to the support body.

In some embodiments, the support structure is one layer of plate-shaped structure or composed of multi-layer plate-shaped structures stacking.

In some embodiments, the support structure is composed of multi-layered plate-shaped structures stacking, and in a thickness direction of the display panel, of two adjacent layers of the plate-shaped structures, a size of the plate-shaped structure close to the panel layer in the first direction is greater than a size of the plate-shaped structure away from the panel layer in the first direction, where the thickness direction of the display panel is perpendicular to the first direction.

In some embodiments, the support structure is a structure continuously extending in a second direction, or the support structure includes multiple segments of support portions at intervals in the second direction, where the second direction is perpendicular to both the first direction and the thickness direction of the display panel.

In some embodiments, when the support structure includes multiple segments of support portions at intervals in the second direction, a sum L of sizes of the multiple segments of support portions in the second direction satisfies the following relationship with a size L0 of the support layer in the second direction:

$$L \geq 0.9L0.$$

In some embodiments, a thickness direction size h1 of the support structure and a thickness direction size h2 of the support layer satisfies the following relationship:

$$h1 \leq 4h2.$$

According to a second aspect of the embodiments of the present disclosure, there is provided a display device, wherein the display device includes a display panel described above.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
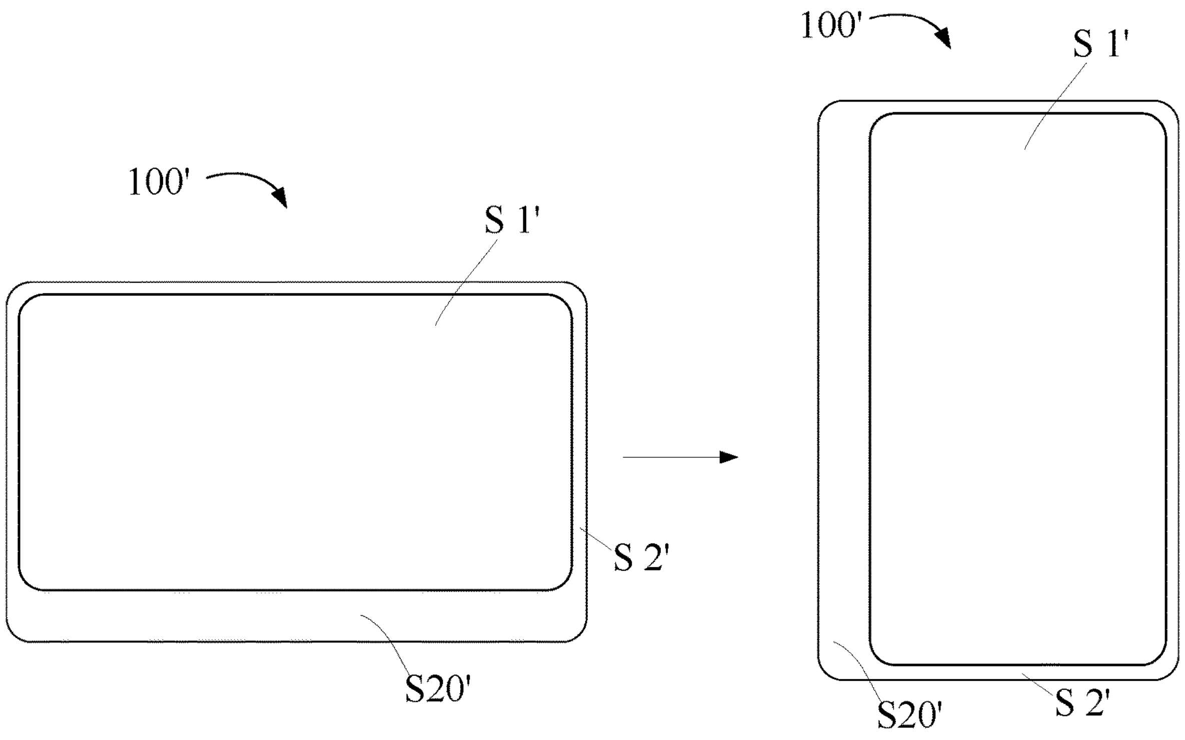
FIG. 1 shows the front view of a display panel under different usage modes in related art.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in this application are only for the purpose of describing specific embodiments, and are not intended to limit this application. Unless otherwise defined, the technical or scientific terms used in this application shall have the usual meaning understood by those ordinarily skilled in the art to which the present disclosure belongs. The use of similar terms such as “a” or “an” in the specification and claims of this application does not indicate a quantity limit, but rather the existence of at least one. “A plurality of” indicates two or more. Similar terms such as “comprising” or “including” refer to components or objects that appear before “comprising” or “including”, including those listed after “comprising” or “including” and their equivalents, and do not exclude other components or objects. Terms such as “connecting to” or “connecting with” are not limited to physical or mechanical connections, and can include electrical connections, whether direct or indirect. Words such as “up” and/or “down” are only for convenience of explanation and are not limited to a single position or spatial orientation. The singular forms of “one”, “said”, and “the” used in this application specification and the accompanying claims are also intended to include the plural form, unless the context clearly indicates other meanings. It should also be understood that the term “and/or” used in this article refers to and includes any or all possible combinations of one or more related listed items.

Compared to LCD panels and rigid OLED panels, the application proportion of flexible OLED panels in commonly used car mounted display devices is increasing. Some car mounted display devices can be used for horizontal screen display (shown in the figure) or vertical screen display. For example, as shown in FIG. 1, a display panel 100' of a vehicle mounted display device has a display area S1' and a non-display area S2' (which can be understood as a border area) disposed on the periphery of S,'. The non-display area S2' has a wider border area S20' corresponding to the back side of the display panel 100' in which the IC chip is bound to the back side of the display panel. The vehicle mounted display device with a display panel of 100' has a wider border area S20' disposed at the bottom border of the display area when being used in the horizontal screen mode, as shown in FIG. 1 on the left side. When being used in the vertical screen mode as shown in FIG. 1 on the right side, the wider border area S20' is disposed on a side of the display area, bringing an unpleasant visual effect to the user.

For this purpose, this application provides a display panel and a display device. The display panel includes a panel layer and a support layer. The panel layer includes a panel area and a bending area disposed on a side of the panel area in a first direction. The support layer is disposed on a back side of the panel area, and the support layer includes a support body and a support structure disposed on a side of the support body away from the panel layer. The support structure is disposed on the inner side of an edge of the support layer corresponding to the bending area, so that the bending area, when being bent, is fixed to the support layer through the support structure. In the display panel, the provision of the support structure enables the bending area, when being bent, to be fixed to the support layer through the support structure. Compared to the implementation of directly bonding the bending area to the side of the support layer away from the panel layer, it is beneficial to reduce the curvature radius of the bending area during bending, thereby reducing the edge width occupied by the bending area, that is, reducing the border width of the display panel at that edge. It is beneficial to reduce the width difference between the border corresponding to the bending area and other borders, thereby improving the user experience.

The display panel referred to in this application can be a flexible OLED panel. This display panel can be applied to a car mounted display device (such as a car mounted navigation display device, a vehicle backup imaging device, etc.) as a display panel for the car mounted display device. However, this display panel can also be applied to a product or a component with a display function such as a mobile phone, a tablet, a television, a laptop, etc., as a display panel for the product or the component such as the mobile phone, the tablet, the television, the laptop with the display function.

The display panel and the display device provided in this application will be described in detail below in conjunction with FIGS. 2 to 10.

Figure 2:
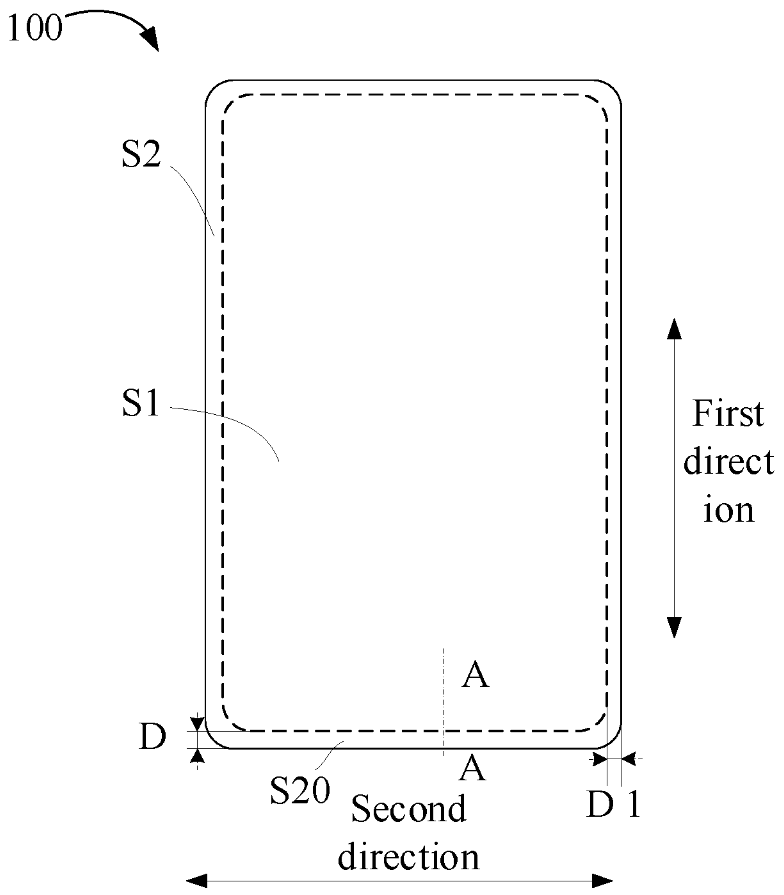
FIG. 2 is a front view of a display panel according to an embodiment of the present disclosure.
Figure 3:
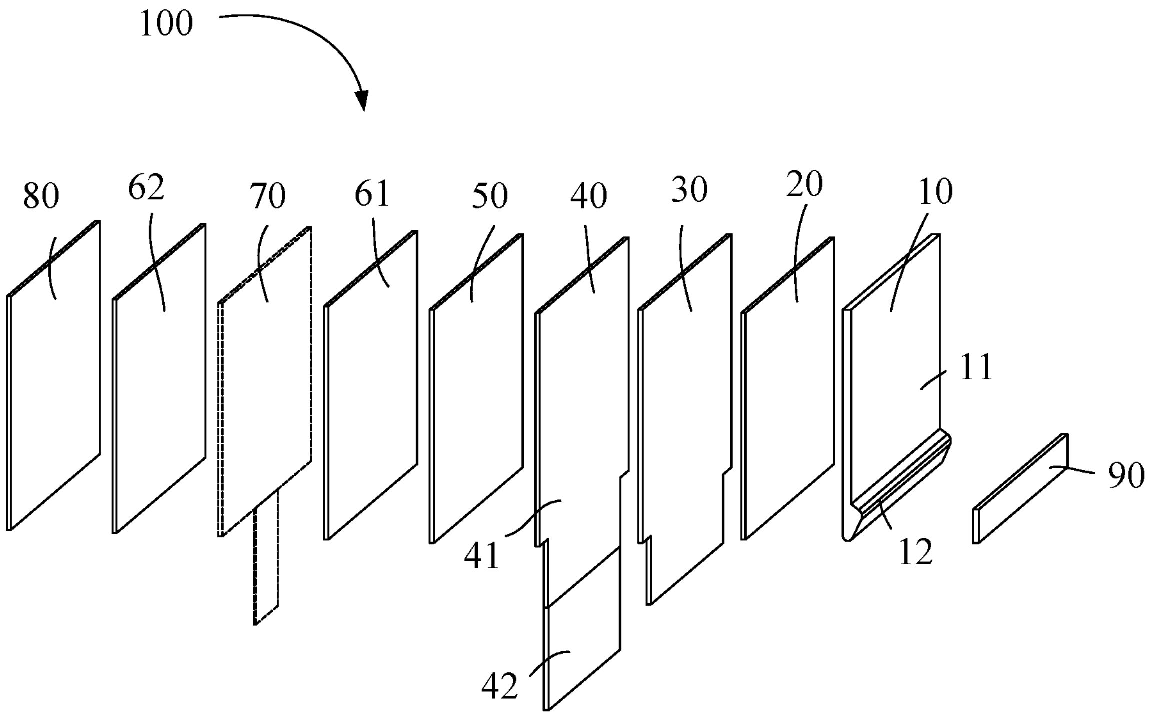
FIG. 3 is an exploded view of a partial structure of a display panel according to an embodiment of the present disclosure.
Figure 4:
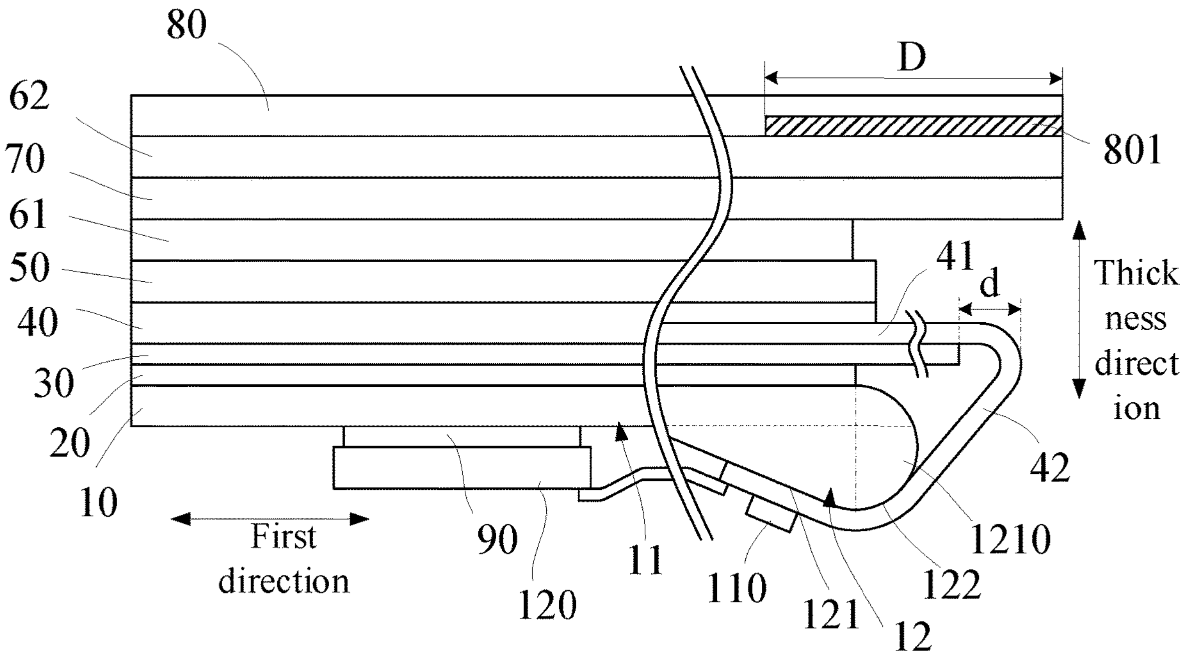
FIG. 4 is a cross-sectional view of a partial structure of a display panel according to an embodiment of the present disclosure.

Firstly, referring to FIG. 2 and, if necessary, with reference to FIGS. 3 and 4, the present application provides a display panel 100. The display panel has a display area S1 and a non-display area S2 disposed on the periphery of the display area. The non-display area S2 can also be understood as the border area. In this embodiment, the non-display area S20 (also known as the border area S20) is disposed on the first side of the display area S1 in the first direction.

It can be understood that the first direction here is the length direction of the display panel 100. However, in other embodiments, the first direction can also be the width direction of the display panel. There are no restrictions on this application.

The display panel referred to here is a flexible organic light-emitting diode (OLED) panel.

The display panel 100 includes a panel layer 40 and a support layer 10. The panel layer 40 includes a panel area 41 and a bending area 42 disposed on a side of the panel area 41 in the first direction. The support layer 10 is disposed on the back side of the panel area 41, and the support layer 10 includes a support body 11 and a support structure 12 disposed on the side of the support body 11 away from the panel layer 40. The support structure 12 is disposed on the inner side of the edge of the support layer 10 corresponding to the bending area 42, so that the bending area 42, when being bent, is fixed to the support layer 10 through the support structure 12.

It can be understood that the panel area 41 and the bending area 42 of the panel layer 40 can be integrated, for example, the bending area 42 can be formed by extending a portion of the flexible film layer of the panel area 41 of the panel layer 40. However, in other embodiments, the bending area 42 can also be a separately flexible structure and pasted onto the panel zone 41 of the panel layer 40 during the preparation process.

The panel area 41 herein includes a light-emitting layer with a light-emitting device and a driving circuit layer with a thin film transistor.

The support layer 10 herein can be a metal support structure layer. For example, metal structures such as copper can be used to provide back support for the display panel 100 while also having a certain degree of heat dissipation function.

In this embodiment, the border area S20 can be understood as the area corresponding to the bending area 42, that is, the bending area 42 is bent towards the back side of the display panel 100 (i.e. the back side of the support layer 10) in the border area S20 and bound to the back side of the support layer 10.

In the display panel 100, the provision of the support structure 12 enables the bending area 42, when being bent, to be fixed to the support layer 10 through the support structure 12. Compared to the implementation of directly bonding the bending area to the side of the support layer away from the panel layer, it is beneficial to increase the size of the bending area 42 extending in the thickness direction and reduce the curvature radius of the bending area 42 during bending. Thus, it is beneficial to reduce the edge width occupied by the bending area 42, that is, to reduce the border width of the display panel 100 at this edge (i.e. the size of the border area S20 in the first direction), and to reduce the width difference between the corresponding border of the bending area 42 and other borders, thereby improving the user experience.

In some embodiments, the support structure 12 includes a transition support surface 122 disposed at the edge of the display panel 100. In the first direction, at least a portion of the transition support surface 122 is a convex round smooth surface.

The transition support surface 122 here can be understood as a surface disposed in the support structure 12 that extends a predetermined width from the corresponding bending area 42 side to the middle of the support structure 12, and all or most of the transition support surface 122 is disposed on the side away from the display panel 100. The preset width can be determined based on specific circumstances.

It can be understood that the bending area 42, when being bent, has its surface against the transition support surface 122. In the first direction, at least a portion of the transition support surface 122 is a convex smooth curved surface, which can support the bending area 42 while also protecting the bending area 42 well. In particular, compared to other non-circular sliding surfaces of the transition support surface, it can prevent the bending area 42 from being subjected to significant support forces when being locally against the support structure 12, which might otherwise have adverse effects on the bending area 42.

In some embodiments, in the first direction, at least a portion of the transition support surface has as a smooth cambered surface.

As shown in FIG. 4, the support structure 12 further includes a transition support surface 122 at an edge of the fixed bonding surface 121 closer to the display panel 100. In the first direction, at least a portion of the transition support surface 122 is in a smooth cambered surface.

It can be understood that in some embodiments, at least a portion of the transition support surface can be a segment of cambered surface. For example, a circular arc surface.

In other embodiments, in the first direction, at least a portion of the transition support surface is connected in sequence by multiple segments of cambered surfaces that are smoothly transitioned. In the multiple segments of cambered surfaces, some cambered surfaces may have different bending degrees or curvatures from those of other cambered surfaces, and the bending degree or curvature of each cambered surface may also vary.

In some embodiments, the support structure 12 includes a fixed bonding surface 121 on a side of the transition support surface 122 closer to the middle of the support layer 10. The fixed bonding surface 121 faces away from the panel layer 40 and in a straight shape, and the connection between the fixed bonding surface 121 and the transition support surface 122 transitions smoothly.

It can be understood that IC chip and other devices can be attached and fixed on the fixed straight bonding surface 121. Here, the fixed bonding surface is set to be straight, facilitating the attachment and fixation of IC chip and other devices.

It can be understood that the fixed boding surface here can also be roughly straight. Alternatively, in some embodiments, the fixed bonding surface of the support structure may not be straight but rather have a smooth curved surface with a larger curvature, and devices such as the IC chip can still be attached thereto.

The smooth transition at the connection between the fixed bonding surface 121 and the transitional support surface 122 can better support and protect the bending area 42.

The surface of the support structure 12 here presents an irregularly shaped smooth surface as a whole. Here, the provision of transition support surface 122 can better protect and support the bending area.

It should be noted that in some embodiments, the support structure may not include a fixed bonding surface. Correspondingly, the bending area, when being bent, can continue to extend inward after being supported by the transition support surface, and can be attached to the surface of the support body. The IC chip and other devices can be attached to the bending area that is attached to the support body, and disposed on the surface of the bending area away from the support body.

In some embodiments, the support structure 12 is integrally formed with the support body 11. This makes the preparation of the entire support layer 10 relatively simple and convenient.

However, in other embodiments, the support structure and support body can also be set separately and fixed together through bonding or other means in the future.

Still referring to FIG. 4, in some embodiments, the support structure 12 is a solid structure formed by a die casting process.

Specifically, the support structure 12 and the support body 11 are formed simultaneously in the same die-casting process.

In some embodiments, the edge of the transition support surface of the support structure can smoothly transition with the edge of the support body or with the surface away from the panel layer.

As shown in FIG. 4, the edge of the transition support surface 122 smoothly transitions to the edge of the support body 11, forming a semi-circular surface 1210. It can be understood that in other embodiments, the surface 1210 can also form a non-semi-circular circular arc surface or a smooth curved surface composed of multiple segments of cambered surfaces with different curvatures.

The inventors have found based on research that in some embodiments, the thickness direction size h1 of the support structure 12 and the thickness direction size h2 of the support layer 10 satisfy the following relationship:

$$h1 \leq 4h2.$$

Under this condition, it is not only able to achieve good control of the border, but also conducive to controlling the thickness direction size of the display panel 100.

In this embodiment, by setting the specific size h1 in the thickness direction of the support structure 12 through a specific structure, the size of the border area S20 can be equal or roughly equal to that of other border areas in the non-display area. This allows the display panel 100 to be used in both horizontal and vertical display modes. The width of a certain border area in the display panel will not cause a negative viewing experience for users, which is beneficial for improving the user experience. For example, in some embodiments, the width D of the border area S20 in FIG. 2 can be equal or roughly equal to the width D1 of other border areas, thereby greatly improving the user experience. It can be understood that D1 shown in FIG. 2 illustrates the width of one border area, and in fact, the widths of the other two border areas besides border area S20 are also corresponding to D1.

Further research by the inventors found that by providing the support structure 12, the width D of the border area S20 can be less than 6 mm. In a preferred implementation, the width D of the border area S20 can be as wide as other border areas (such as D1), reaching 4 mm or even smaller.

In addition, the display panel 100 may also include a back panel layer 30 (i.e. BF layer) and a heat dissipation layer 20 disposed between the panel layer 40 and the support layer 10, and a polarizer 50, an optical adhesive layer 61, a touch layer 70, an optical adhesive layer 62, and a cover layer 80 sequentially stacked on a side of the panel layer 40 away from the support layer 10. The display panel 100 can also include a circuit board (i.e. PCB board) attached to the side of the support layer 10 away from the panel layer 40 through adhesive 90, and an IC chip 110 attached to the side of the bending area 42 away from the support structure 12. The chip 110 is electrically connected to the PCB board through connecting wires.

A light shielding area 801 is provided on an edge of the cover layer 80 corresponding to the non-display area S2. The light shielding area 801 can be formed through methods such as screen printing ink. It can be understood that the non-display area corresponding to the light shielding area 801 in FIG. 4 is the border area S20. The above implementation is beneficial for reducing the curvature radius of the bending area 42 when being bent, thereby reducing the edge width occupied by the bending area 42. i.e. reducing the size of the width d, thereby reducing the size of the width D of the light shielding area 801. i.e. reducing the size of the display panel 100 in the first direction of the border area S20, which is beneficial for reducing the width difference between the border area S20 corresponding to the bending area 42 and other borders. This is beneficial for improving the user experience.

It can be understood that in the embodiments shown in FIGS. 3 and 4 above, the support structure 12 is a structure continuously extending in a second direction. However, in other embodiments, the support structure may also include multiple segments of support portions at intervals in the second direction. Here, the second direction is perpendicular to both the first direction and the thickness direction of the display panel.

The second direction herein can be understood as the width direction of the display panel. However, in other embodiments, the second direction can also be understood as the length direction. There are no specific restrictions on this application.

Figure 5:
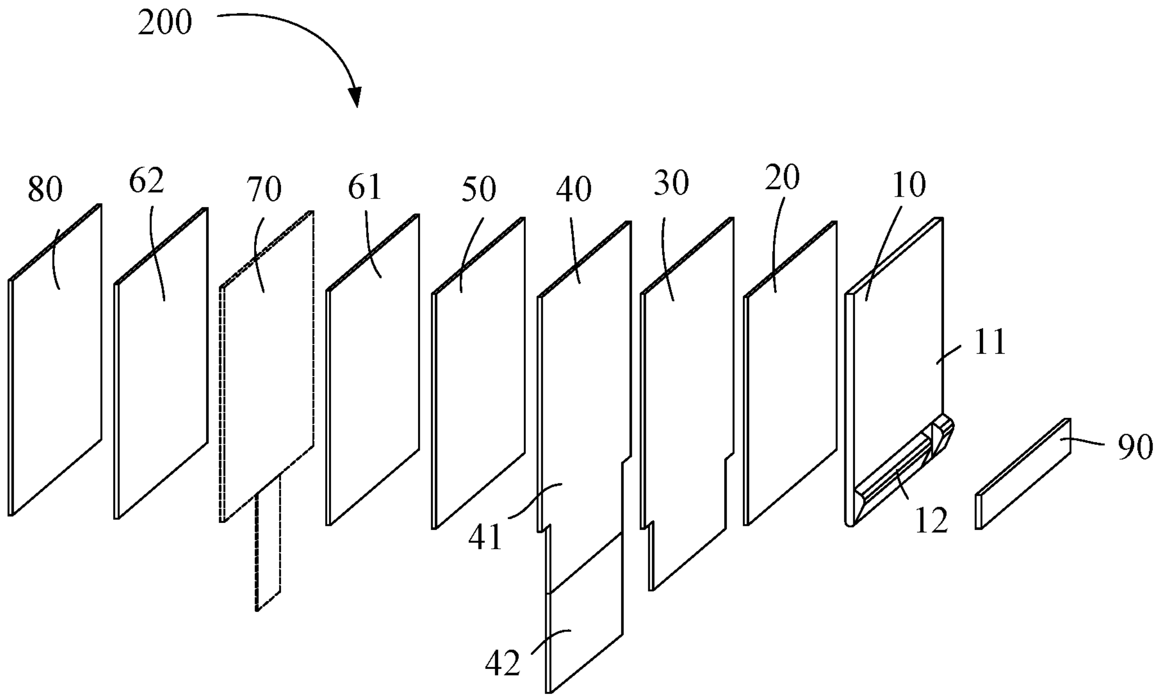
FIG. 5 is an exploded view of a partial structure of another display panel according to an embodiment of the present disclosure.
Figure 6:
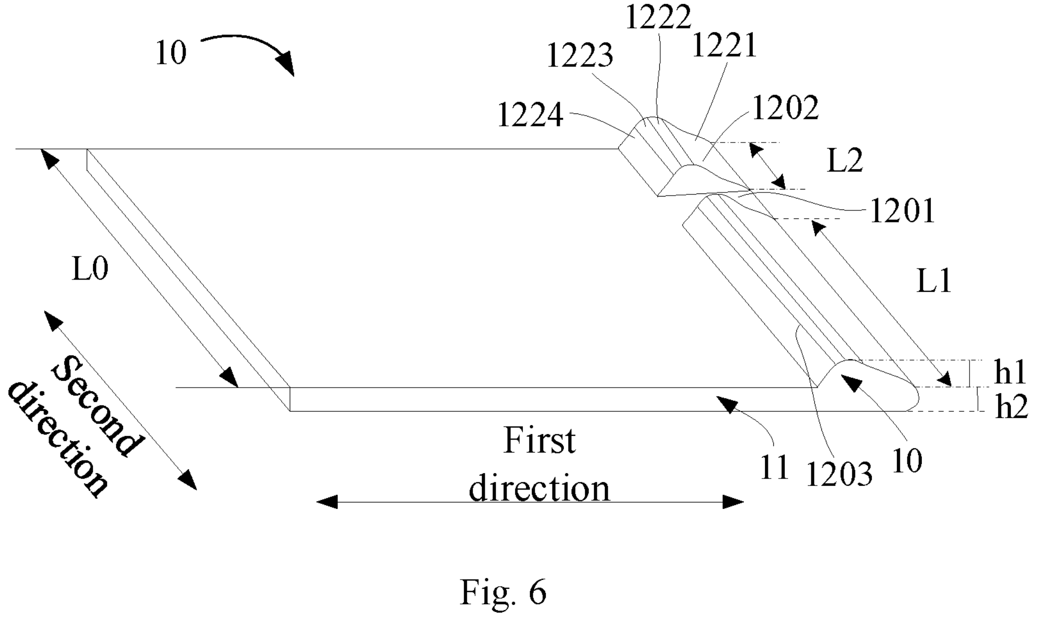
FIG. 6 is a structural schematic diagram of a support layer with a support structure according to an embodiment of the present disclosure.

For example, referring to FIG. 5 and, if necessary, in conjunction with FIG. 6, in some embodiments, this application provides another display panel 200, in which the support structure 12 includes multiple segments of support portions at intervals in the second direction. The sum L of the sizes of the multiple segments of support portions in the second direction satisfies the following relationship with the size L0 of the support layer 10 in the second direction:

$$L \geq 0.9L0.$$

This condition not only saves manufacturing costs, but also enables the support structure 12 to effectively support the bending area.

As shown in FIG. 6, the support structure 12 includes two segments: a first support portion 1202 and a second support portion 1203 separated by a notch 1201. Here, the size of the first support portion 1202 in the second direction is L2, and the size of the second support portion 1203 in the second direction is L1. The sum of the sizes of the two segments: the first support portion 1202 and the second support portion 1203 in the second direction is L1+L2. If the size of the support layer 10 in the second direction is L0, the sum L1+L2 of these sizes is equal to or greater than 0.9L0.

However, in other embodiments, the support structure 12 may also include more support structures arranged at intervals in the second direction, which is not limited in this application.

It can be understood that the size of the bending area in the second direction is smaller than the size of the support structure in the second direction, and generally corresponds to the panel area in the middle. Therefore, for the multiple segments of support portions at intervals, the multiple segments of support portions can be more concentrated in the middle area.

Still referring to FIG. 6, the surface of the support structure 12 away from the support body 11 or away from the panel layer 40 forms an outer convex curved surface as a whole. This surface can serve as a transitional support surface 122 as a whole. In the first direction, the transition support surface 122 includes a first segment of surface 1221, a second segment of surface 1222, a third segment of surface 1223, and a fourth segment of surface 1224 connected in sequence. The first segment of surface 1221, the second segment of surface 1222, the third segment of surface 1223, and the fourth segment of surface 1224 connected in sequence here are all smooth curved surfaces, and the connections between adjacent surfaces in the first segment of surface 1221, the second segment of surface 1222, the third segment of surface 1223, and the fourth segment of surface 1224 are all smooth transitions.

It can be seen that at least the second segment of surface 1222 and the third segment of surface 1223 are convex cambered surfaces with different curvatures.

It can be understood that in other embodiments, the first segment of surface 1221, the second segment of surface 1222, the third segment of surface 1223, and the fourth segment of surface 1224 can also be partially used as transitional support surfaces 122. For example, the first segment of surface 1221, the second segment of surface 1222, and the third segment of surface 1223 can be used as a transitional support surface 122, or the second segment of surface 1222 and the third segment of surface 1223 can be used as a transitional support surface 122. The fourth segment of surface 1224 can serve as a fixed bonding surface.

It can be understood that when the fourth segment of surface 1224 is used as a fixed bonding surface, its overall shape can be made more straight.

The other structures of the display panel 200 are similar to those of the display panel 100, and reference can be made to the relevant descriptions above.

For the method of integrated molding with the support body 11, in addition to using die casting technology, other methods can also be used to form. For example, it is formed through plate bending.

Figure 7:
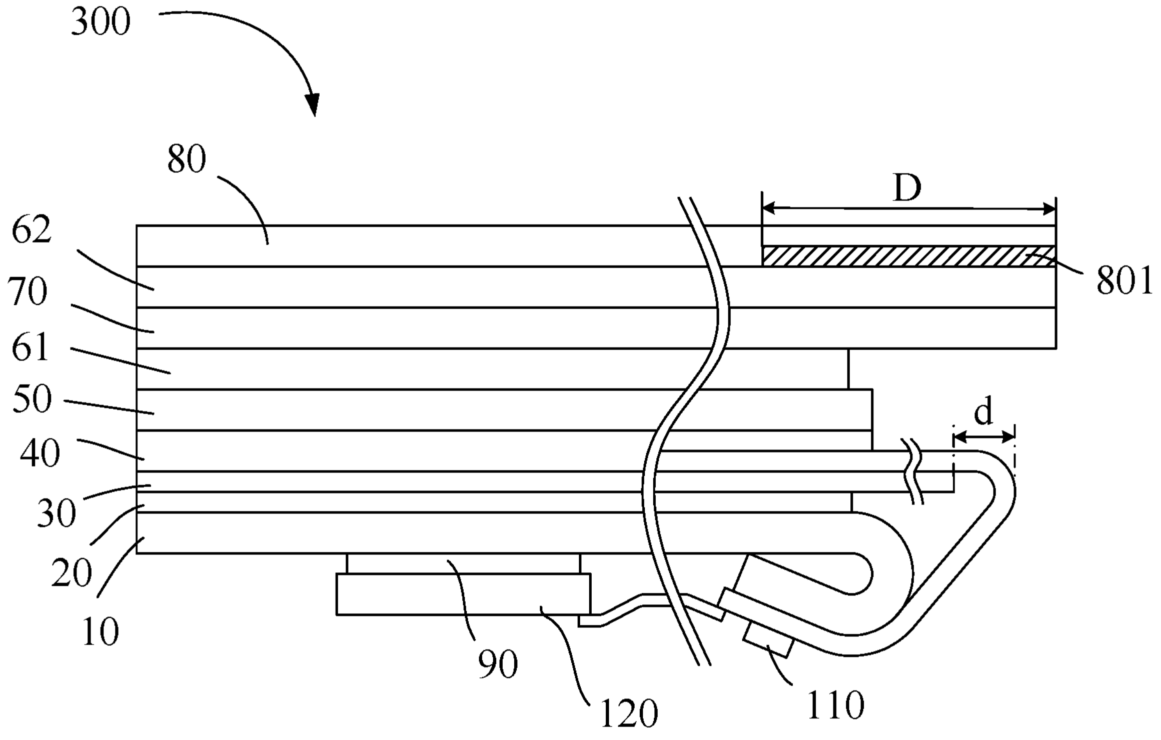
FIG. 7 is a cross-sectional view of a partial structure of another display panel according to an embodiment of the present disclosure.

Referring to FIG. 7, in other embodiments, the present application also provides a display panel 300, in which the support body 11 is a plate-shaped structure, and the support structure 12 is formed by bending a plate-shaped structure connected to the support body 11.

This type of support structure 12 can be a continuous structure that extends continuously in the second direction, or it can include more segments of support portions arranged at intervals.

The external shape of the support structure 12 is similar to the external shape of the support structure shown in FIGS. 3 and 4 above, and reference can be made to the relevant description above.

It can be understood that the above support structure 12 can also be set to other shapes, and there are no specific limitations here.

The other structures of the display panel 300 are similar to those of the display panel 100, and reference can be made to the relevant descriptions above.

For the implementation of separating the support structure and the support body, the overall shape and specific structure of the support structure 12 can be set as needed, and it is convenient for the manufacturing of the support structure 12.

Figure 8:
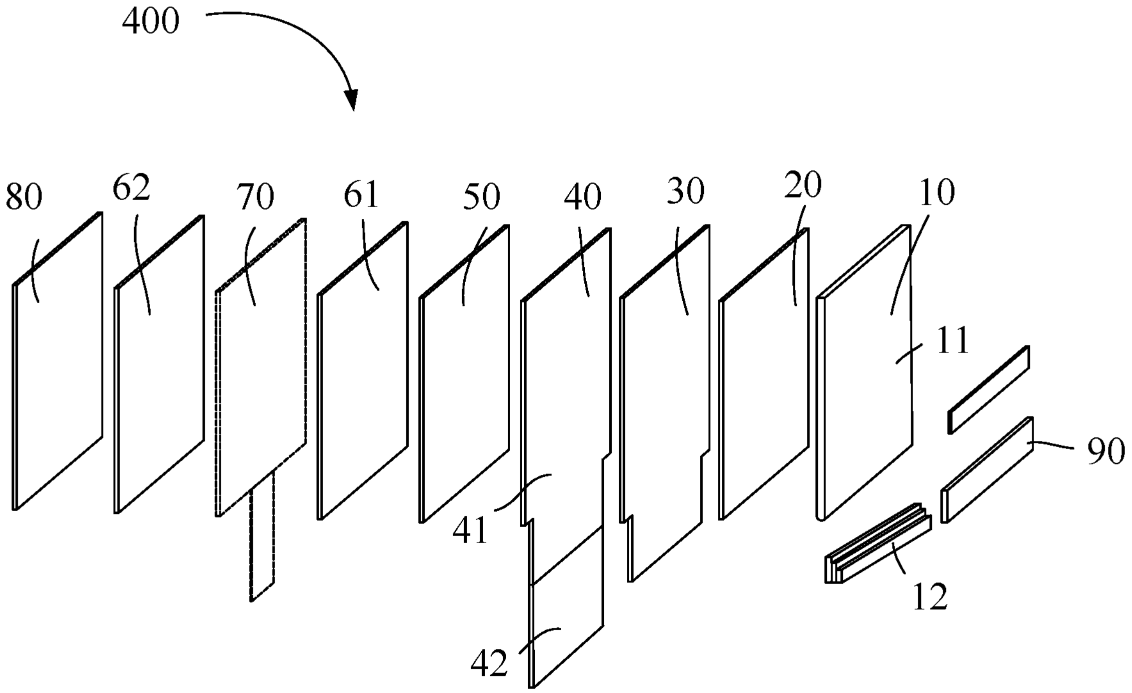
FIG. 8 is an exploded view of a partial structure of a display panel according to an embodiment of the present disclosure.
Figure 9:
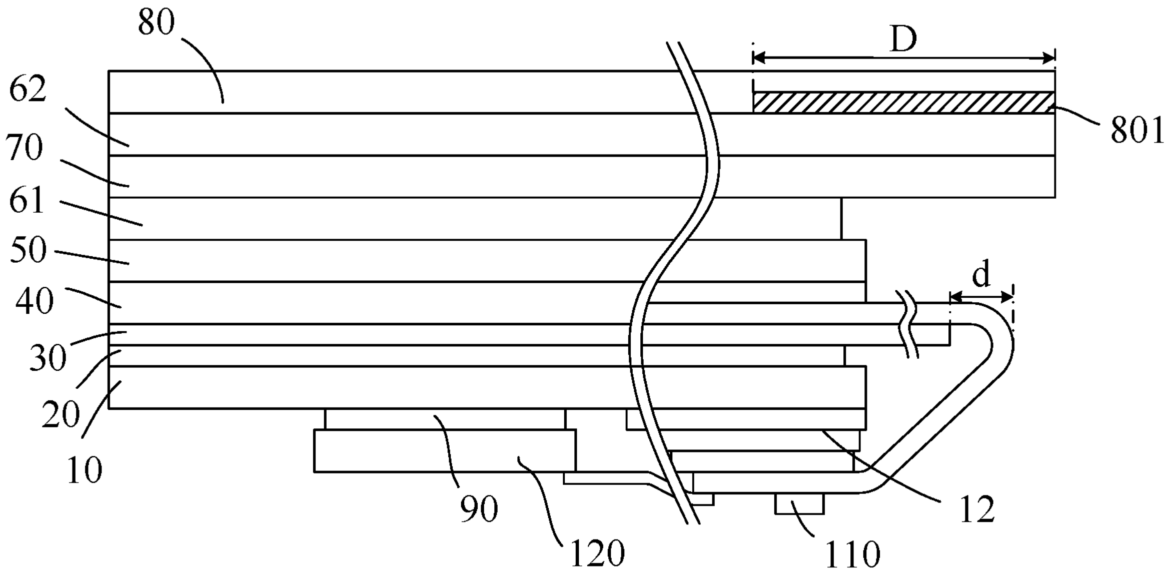
FIG. 9 is a sectional view of a partial structure of a display panel according to an embodiment of the present disclosure.
Figure 10:
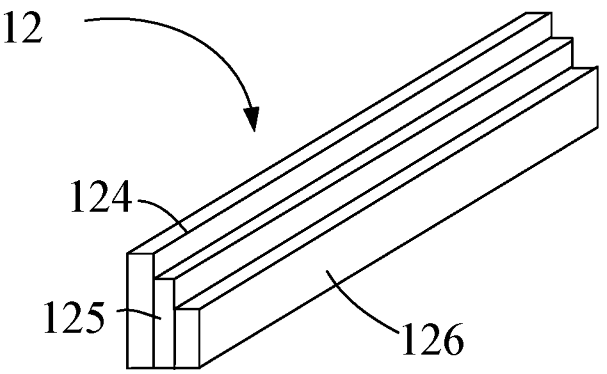
FIG. 10 is a structural schematic diagram of a support structure shown according to an embodiment of the present disclosure.

Referring to FIG. 8 and, if necessary, combined with FIGS. 9 and 10, in other embodiments, the present application provides a display panel 400, in which the support structure 12 is one layer of plate-shaped structure or composed of multi-layer plate-shaped structures stacking.

For example, as shown in FIG. 10, the support structure 12 is stacked by multi-layer structures 124, 125, and 126. The layer structures 124 and 126 in this multi-layer structure can be adhesive. 125 is a strong support structure layer, such as a metal layer or a support layer formed by gas materials.

However, in other embodiments, the three-layer structure can also be a strong support structure layer.

It can be understood that in other embodiments, the support structure 12 can also be a multi-layer stacked structure of other number of layers such as 2 or 4 layers.

It should be noted that in this embodiment, the side of the support structure 12 away from the panel layer 40 is the fixed bonding surface 121, without a smooth transitional support surface. It can be understood that in other embodiments, a separate support structure 12 formed by multi-layer stacking can also be provided with a transition support surface as needed to facilitate smooth transition of the bending area, providing better protection and support for the bending area.

Furthermore, in some embodiments, the support structure 12 is composed of multi-layered plate-shaped structures. In a thickness direction of the display panel 100, of two adjacent layers of the plate-shaped structures, a size of the plate-shaped structure close to the panel layer 40 in the first direction is greater than that of the plate-shaped structure away from the panel layer 40 in the first direction, where the thickness direction of the display panel is perpendicular to the first direction.

Still referring to FIG. 10, the multi-layer plate-shaped structural layers 124, 125, and 126 can form a wedge-shaped support structure.

However, the support structure 12 formed by stacking multiple layers of plate-shaped structures may not be limited in size. For example, it can also be stacked into a rectangular or other shaped support structure.

The other structures of the display panel 400 are similar to those of the display panel 100, and reference can be made to the relevant descriptions above.

This application provides a display device. The display device may include a display panel 100 as shown above or a similar display panel. The display device also includes a device body with a casing. The display panel 100 or similar display panels can be specifically assembled on the device body.

The display device can be a car navigation display device, a vehicle back-up imaging device, or a product or a device with display functions such as a mobile phone, a tablet, a TV, a laptop, etc.

In this application, the structural embodiments and method embodiments can complement each other without conflict.

In the present disclosure, the terms "first" and "second" are only used to describe the purpose and cannot be understood as indicating or implying relative importance. The terms "multiple" and "several" refer to two or more, unless otherwise specified.

Other implementations of the present disclosure will be apparent to those skilled in the art from consideration of the specification and practice of the present disclosure herein. The present application is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A display panel, comprising:

a panel layer comprising a panel area and a bending area disposed on a side of the panel area in a first direction;

a support layer disposed on a back side of the panel area, the support layer comprising a support body and a support structure disposed on a side of the support body away from the panel area, and in the first direction, the support structure being disposed on a side, which is close to a middle of the support layer, of an edge of the support layer corresponding to the bending area, so that the bending area, when being bent, is fixed to the support layer through the support structure;

wherein the support structure is a structure continuously extending in a second direction, or the support structure comprises multiple segments of support portions at intervals in the second direction, where the second direction is perpendicular to both the first direction and a thickness direction of the display panel;

wherein when the support structure comprises multiple segments of support portions at intervals in the second direction, a sum L of sizes of the multiple segments of support portions in the second direction satisfies the following relationship with a size L0 of the support layer in the second direction:

$$L \geq 0.9L0.$$

2. The display panel of claim 1, wherein the support structure comprises a transition support surface disposed at an edge of the display panel, and in the first direction, at least a portion of the transition support surface is a convex smooth curved surface.

3. The display panel of claim 2, wherein in the first direction, at least a portion of the transition support surface is a segment of cambered surface, or at least a portion of the transition support surface includes multiple segments of cambered surfaces that are connected with each other in sequence and smoothly transition.

4. The display panel of claim 2, wherein the support structure comprises a fixed bonding surface in the transition support surface disposed closer to the middle of the support layer, the fixed bonding surface facing away from the panel layer and in a straight shape, and connection between the fixed bonding surface and the transition support surface transitions smoothly.

5. The display panel of claim 1, wherein the support structure is integrally formed with the support body.

6. The display panel of claim 5, wherein the support structure is a solid structure formed by a die casting process; or, the support body is a plate-shaped structure, and the support structure is formed by bending a plate-shaped structure connected to the support body.

7. The display panel of claim 1, wherein the support structure is one layer of plate-shaped structure or composed of multi-layer plate-shaped structures stacking.

8. The display panel of claim 7, wherein the support structure is composed of multi-layered plate-shaped structures stacking, and in the thickness direction of the display panel, of two adjacent layers of the plate-shaped structures, a size of the plate-shaped structure close to the panel layer in the first direction is greater than a size of the plate-shaped structure away from the panel layer in the first direction, where the thickness direction of the display panel is perpendicular to the first direction.

9. The display panel of claim 1, wherein a thickness direction size h1 of the support structure and a thickness direction size h2 of the support layer satisfies the following relationship:

$$h1 \leq 4h2.$$

10. A display device, wherein the display device comprises the display panel of claim 1.

11. The display device of claim 10, wherein the support structure comprises a transition support surface disposed at an edge of the display panel, and in the first direction, at least a portion of the transition support surface is a convex smooth curved surface.

12. The display device of claim 11, wherein in the first direction, at least a portion of the transition support surface is a segment of cambered surface, or at least a portion of the transition support surface includes multiple segments of cambered surfaces that are connected with each other in sequence and smoothly transition.

13. The display device of claim 11, wherein the support structure comprises a fixed bonding surface in the transition support surface disposed closer to the middle of the support layer, the fixed bonding surface facing away from the panel layer and in a straight shape, and connection between the fixed bonding surface and the transition support surface transitions smoothly.

14. The display device of claim 11, wherein the support structure is integrally formed with the support body, the support structure is a solid structure formed by a die casting process; or, the support body is a plate-shaped structure, and the support structure is formed by bending a plate-shaped structure connected to the support body.

15. The display device of claim 10, wherein the support structure is one layer of plate-shaped structure or composed of multi-layer plate-shaped structures stacking, when the support structure is composed of multi-layered plate-shaped structures stacking, and in a thickness direction of the display panel, of two adjacent layers of the plate-shaped structures, a size of the plate-shaped structure close to the panel layer in the first direction is greater than a size of the plate-shaped structure away from the panel layer in the first direction, where the thickness direction of the display panel is perpendicular to the first direction.

16. The display device of claim 10, wherein a thickness direction size h1 of the support structure and a thickness direction size h2 of the support layer satisfies the following relationship:

$$h1 \leq 4h2.$$

* * * * *